(12) United States Patent
Fang et al.

(10) Patent No.: US 9,383,585 B2
(45) Date of Patent: Jul. 5, 2016

(54) THREE-DIMENSIONAL LIQUID CRYSTAL DISPLAY DEVICE

(71) Applicant: Shenzhen China Star Optoelectronics Technology Co., Ltd., Guangdong (CN)

(72) Inventors: Bin Fang, Guangdong (CN); Changchengmr Lo, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 202 days.

(21) Appl. No.: 14/130,328

(22) PCT Filed: Dec. 6, 2013

(86) PCT No.: PCT/CN2013/088760
§ 371 (c)(1),
(2) Date: Dec. 31, 2013

(87) PCT Pub. No.: WO2015/078040
PCT Pub. Date: Jun. 4, 2015

(65) Prior Publication Data
US 2015/0301341 A1    Oct. 22, 2015

(30) Foreign Application Priority Data
Nov. 26, 2013 (CN) .......................... 2013 1 0608500

(51) Int. Cl.
*G02F 1/13* (2006.01)
*G02B 27/22* (2006.01)
*G02F 1/1343* (2006.01)

(52) U.S. Cl.
CPC ............ *G02B 27/22* (2013.01); *G02B 27/2214* (2013.01); *G02F 1/13* (2013.01); *G02F 1/132* (2013.01); *G02F 1/13439* (2013.01)

(58) Field of Classification Search
CPC ...... G02B 27/2214; G02B 27/22; G02B 1/13; G02B 1/13439

USPC ........................................................... 349/15
See application file for complete search history.

(56) References Cited

U.S. PATENT DOCUMENTS 7,502,092 B2 * 3/2009 Park .................. G02F 1/133382
349/161
7,750,981 B2 * 7/2010 Shestak .............. G02B 27/2214
349/15

(Continued)

FOREIGN PATENT DOCUMENTS

CN    1609664    4/2005
CN    1716070    1/2006

(Continued)

OTHER PUBLICATIONS

International Search Report Dated Sep. 11, 2014 From the State Intellectual Property Office of the People's Republic of China Re. Application No. PCT/CN2013/088760 and Its Translation Into English.

*Primary Examiner* — James Dudek (57) ABSTRACT

A three-dimensional (3D) liquid crystal display (LCD) device is disclosed herein and the 3D LCD device includes an LCD layer, an LC electrode layer and a transparent electrode layer. The LC electrode layer is disposed on the LCD layer and a voltage is applied to the LC electrode layer to switch between 2D mode and 3D mode. The transparent electrode layer is disposed on the LC electrode layer and a voltage or current is applied to the transparent electrode layer to generate a certain heat in the 3D mode. The heat generated by the transparent electrode layer increases the temperature of the LC electrode layer so as to increase the response time of the 3D LCD device and improve the naked eye type 3D display effect of the 3D LCD device.

10 Claims, 7 Drawing Sheets

(56) References Cited

U.S. PATENT DOCUMENTS

| | | | |
|---|---|---|---|
| 2001/0007733 A1* | 7/2001 | Matsuyama | G02B 5/201 430/7 |
| 2005/0083443 A1* | 4/2005 | Lee | G02F 1/133382 349/21 |
| 2005/0285994 A1 | 12/2005 | Park et al. | |
| 2007/0035672 A1 | 2/2007 | Shestak et al. | |
| 2010/0045913 A1 | 2/2010 | Liu et al. | |
| 2011/0310331 A1* | 12/2011 | Heo | G02F 1/133615 349/64 |
| 2014/0078408 A1 | 3/2014 | Shim et al. | |

FOREIGN PATENT DOCUMENTS

| | | |
|---|---|---|
| CN | 1908734 | 2/2007 |
| CN | 101655620 | 2/2010 |
| CN | 101950085 | 1/2011 |
| CN | 102289102 | 12/2011 |
| EP | 1750459 | 2/2007 |
| KR | 10-2007-0002503 | 1/2007 |
| WO | WO 2015/078040 | 6/2015 |

* cited by examiner

THREE-DIMENSIONAL LIQUID CRYSTAL DISPLAY DEVICE

RELATED APPLICATIONS

This application is a National Phase of PCT Patent Application No. PCT/CN2013/088760 having International filing date of Dec. 6, 2013, which claims the benefit of priority of Chinese Patent Application No. 201310608500.9 filed on Nov. 26, 2013. The contents of the above applications are all incorporated by reference as if fully set forth herein in their entirety.

FIELD OF THE DISCLOSURE

The present invention relates to a three-dimensional liquid crystal display device, and more particularly to a liquid crystal display device to improve a naked eye type three-dimensional display performance.

BACKGROUND OF THE DISCLOSURE

Figure 1A:
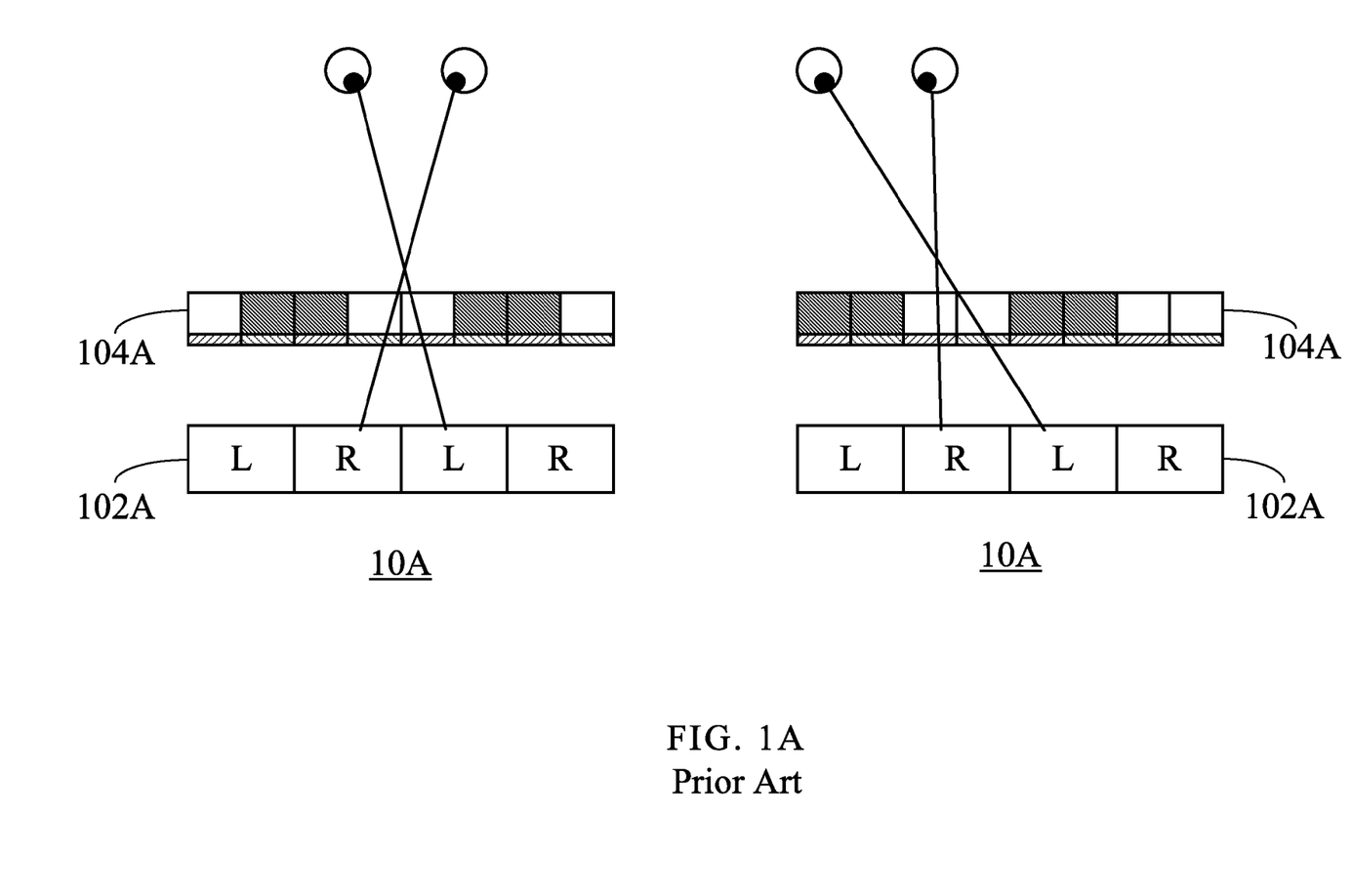
FIG. 1A is a view of a conventional 3D LCD device implementing the LC barrier way.

Since the improved development of the manufacture of the liquid crystal display device, three-dimensional (3D) liquid crystal display (LCD) devices have become the next mainstream of the LCD industry. The 3D LCD device includes a glasses type and a naked eye type. The glasses type 3D LCD device requires the user to wear a pair of specific 3D glasses when watching images. Without wearing the 3D glasses, the image seen on the 3D LCD device is fuzzy. Since the glasses type 3D LCD device requires 3D glasses to see the 3D effect, it is inconvenient and market penetration is low. The naked eye type is more convenient to satisfy the requirement thereof. The naked eye type display technique includes a barrier manner and a lens manner. The technology theory of the barrier manner in the naked eye type 3D display technique is to block the image for the left eye being seen in the right eye, and also block the image for the right eye being seen in the left eye in order to perform the naked eye type 3D display effect. In addition, the barrier manner of the naked eye type in the 3D display further includes a fixed barrier way and an LC barrier way. The LC barrier way is to control an LC electrode voltage to perform a blocking effect on the LC layer, and the switch between 2D mode and 3D mode is performed by either applying the voltage or not. FIG. 1A is a view of a conventional 3D LCD device implementing the LC barrier way. As shown in FIG. 1A, in the 3D LCD device 10A with an LCD barrier, an LCD barrier 104A is disposed on the LCD panel 102A. The switch between transparent and opaque is performed by the LC barrier 104A to achieve the 3D LCD display result. When the user's eyes are moving, a Charge-Coupled Device (CCD) detects a change of movement in the user's eyes in order to vary the electrode voltage so as to perform the switch between transparent and opaque. Therefore, the proper image can be seen by the left and right eye when the user's eyes are moving.

Figure 1B:
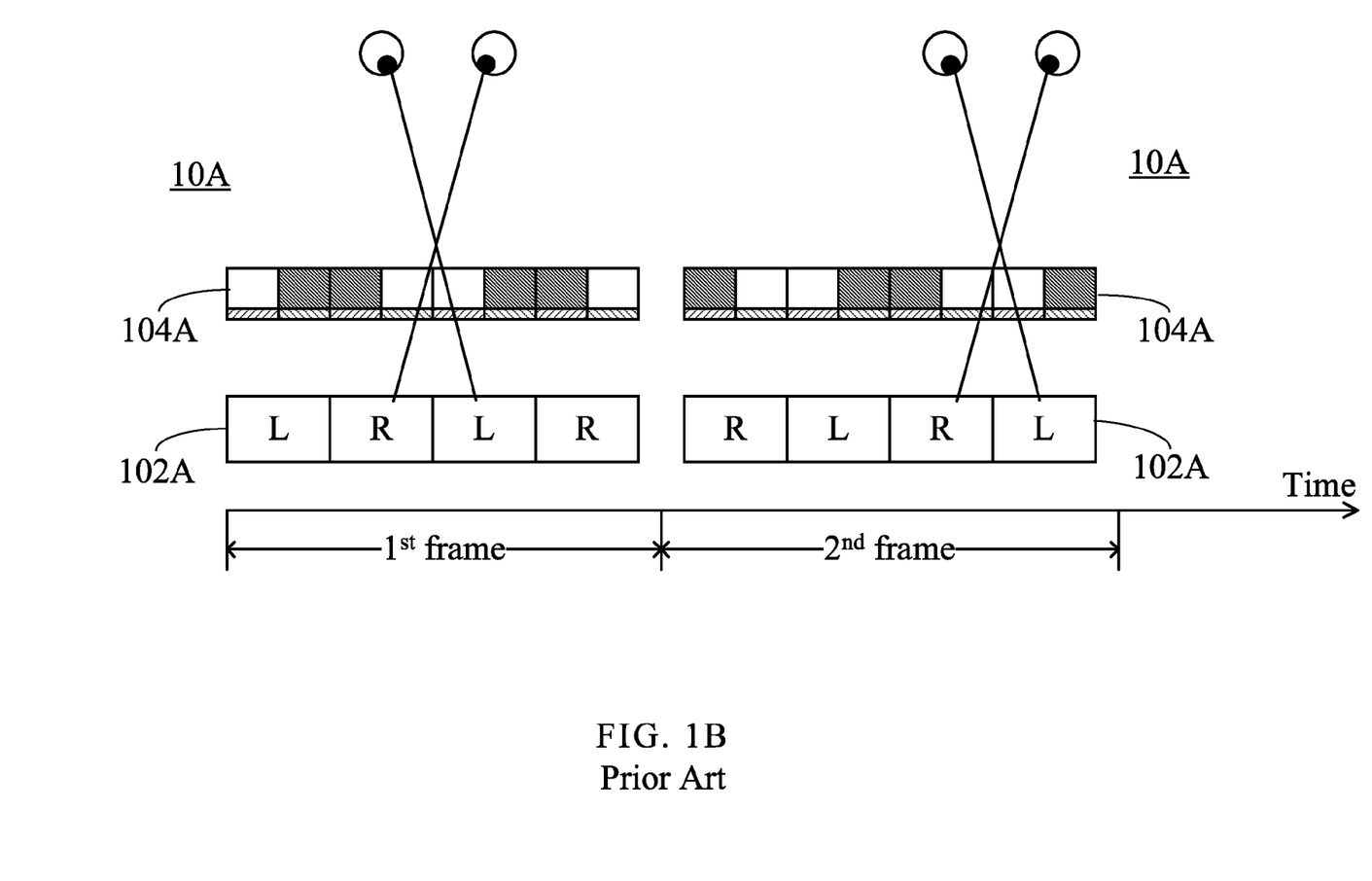
FIG. 1B is a view of a frame changing of the 3D LCD device implementing the LC barrier way.

In a normal situation, no more than half of the image resolution of a 3D image can be seen by the LC barrier manner of the 3D display. In order to achieve full image resolution of the 3D effect, a time-multiplex manner is implemented and the inversion of the signal for the left and right eye on the LC barrier and the pixels is dynamically adjusted to perform watching all pixel images by single eye. Therefore, full image resolution of the 3D effect can be achieved. FIG. 1B is a view illustrating the frame changing of the 3D LCD device implementing the LC barrier way. As shown in FIG. 1B, when the LC barrier is in a dynamic switching period and one frame is changed once per time, the pixels in the image of the left and right eye change one frame once per time.

Figure 1C:
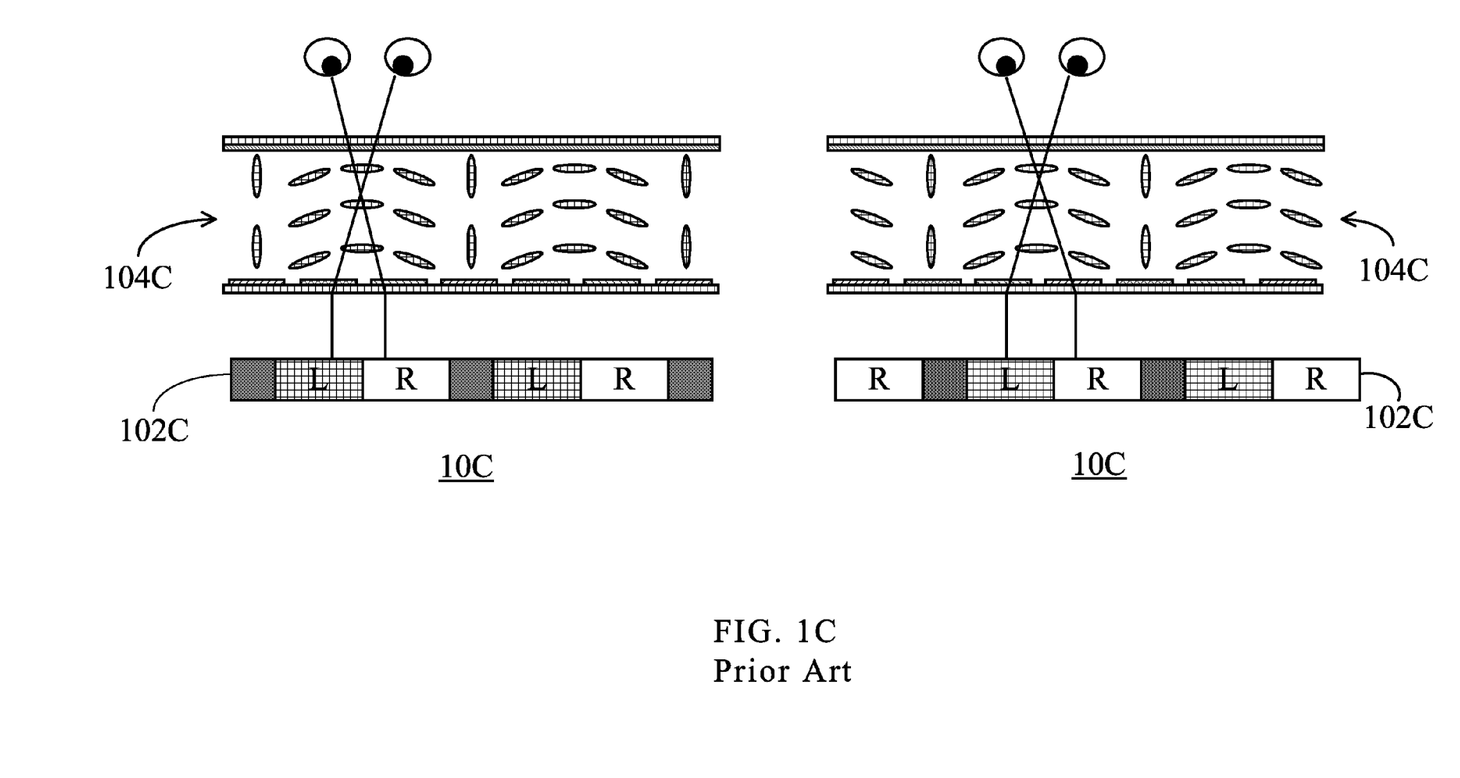
FIG. 1C is a view of a conventional lens manner of the naked eye type 3D LCD device.

FIG. 1C is a view of a conventional lens manner of the naked eye type 3D LCD device. As shown in FIG. 1C, in this 3D LCD device 10C, a LC lens layer 104C is disposed on the LCD panel 102C to perform the 3D LCD effect. The display theory of the LC lens manner of the naked eye type 3D display is to apply voltage to the electrode of the LC lens layer 104C to perform a specific LC guiding in the LC lens layer 104C and the lens condensing in lens. The signal for the left and right eye in a single lens can be transmitted to the left and right eye by the lens to perform the 3D display effect. The switch between 2D mode and 3D mode can also be performed by applying voltage to the electrode of the LC lens layer 104C. The LC lens layer 104C can also be implemented with an eye-tracking system. When the user's eyes are moving, the movement information is detected in accordance with the position of the user's eyes to determine which voltage is applied to a different position of the LC lens layer. The corresponding variation of the pixels is also implemented to receive the proper image for the left and right eye.

However, for the 3D LC thin layer of the foregoing naked eye type in the voltage-applied dynamic switching period, since the response time of the LC is not fast enough, an obvious optical variation can be seen during viewing (due to the LC switching is too slow). For example, in a human eye detecting system, when the position of the user's eyes is changed, an image shaking problem can be found. In a full resolution time-multiplex of the naked eye type 3D display, since the response time of the LC is not fast enough, critical 3D crosstalk and image shaking are detected. The response time of the LC is related to a viscosity coefficient. When the viscosity coefficient is larger, the response time is slower. In addition, the viscosity coefficient is related to the temperature. When the temperature is lower, the viscosity coefficient is larger. When the temperature is lower and the viscosity coefficient is larger, the response time is slower and the 3D effect is worse. On the other hand, when the temperature is higher, the viscosity coefficient is smaller and the response time of the LC is faster and the 3D effect is better.

Therefore, when the external temperature is reduced, the response time of the LC in the above mentioned 3D display technique becomes slower and the 3D effect becomes worse. Even at room temperature, the response time of the LC is not fast enough, advance modifications and applications for the naked eye type of the 3D display effect are certainly affected. Accordingly, a need has arisen to design a naked eye manner of the 3D device to speed up the response time of the LC so as to improve the 3D display effect.

SUMMARY OF THE DISCLOSURE

One objective of the present invention is to provide a three-dimensional (3D) liquid crystal display (LCD) device to improve the 3D display performance.

In order to solve the technical problem described above, a three dimension (3D) liquid crystal display (LCD) device is disclosed in the present invention and comprises an LCD layer, a liquid crystal electrode layer, and a transparent electrode layer. The liquid crystal (LC) electrode layer is disposed on the LCD layer and a voltage is applied to the LC electrode layer to switch between 2D mode and 3D mode. The transparent electrode layer is disposed on the LC electrode layer and a voltage or current is applied to the transparent electrode layer to generate a certain heat in the 3D mode. The heat generated by the transparent electrode layer increases a temperature of the LC electrode layer so as to increase a response time of the 3D LCD device and improve the naked eye type 3D display effect of the 3D LCD device.

In one embodiment of the present invention, the LC electrode layer is a barrier, an LC lens or an LC prism.

In one embodiment of the present invention, a material of the transparent electrode layer is selected from the group consisting of Indium Tin Oxide (ITO), Aluminum Zinc Oxide (AZO), Indium Gallium Zinc Oxide (IGZO), Indium Zinc Oxide (IZO), Carbon Nanotube (CNT), Graphane, and Metal Mesh.

In one embodiment of the present invention, the heat generated by the transparent electrode layer reduces the viscosity coefficient of LC in the LC electrode layer to increase the response time of the 3D LCD device.

In one embodiment of the present invention, the 3D LCD device further comprises a transparent sheltering layer disposed between the LC electrode layer and the transparent electrode layer, and is configured for reducing an effect from an electrical field of the transparent electrode layer on the electrical field of the LC electrode layer.

Another objective of the present invention is to provide a 3D LCD device to increase the response time of the LC and improve the 3D display effect.

In order to solve the technical problem above, a 3D LCD device is disclosed in the present invention and comprises an LCD layer, a liquid crystal electrode layer, and a transparent electrode layer. The liquid crystal (LC) electrode layer is disposed on the LCD layer and a voltage is applied to the LC electrode layer to switch between 2D mode and 3D mode. The transparent electrode layer is disposed between the LCD layer and the LC electrode layer, and a voltage or current is applied to the transparent electrode layer to generate a certain heat in the 3D mode. The heat generated by the transparent electrode layer increases the temperature of the LC electrode layer so as to increase a response time of the 3D LCD device and improve the naked eye type 3D display effect of the 3D LCD device.

In one embodiment of the present invention, the LC electrode layer is a barrier, an LC lens or an LC prism.

In one embodiment of the present invention, a material of the transparent electrode layer is selected from the group consisting of Indium Tin Oxide (ITO), Aluminum Zinc Oxide (AZO), Indium Gallium Zinc Oxide (IGZO), Indium Zinc Oxide (IZO), Carbon Nanotube (CNT), Graphane, and Metal Mesh.

In one embodiment of the present invention, the heat generated by the transparent electrode layer reduces the viscosity coefficient of LC in the LC electrode layer to increase a response time of the 3D LCD device.

In one embodiment of the present invention, the 3D LCD device further comprises a transparent sheltering layer disposed between the LC electrode layer and the transparent electrode layer and configured for reducing an effect from an electrical field of the transparent electrode layer on the electrical field of the LC electrode layer.

DETAILED DESCRIPTION OF THE PREFERRED EMBODIMENTS

The above-mentioned description of the present invention can be best understood by referring to the following detailed description of the preferred embodiments and the accompanying drawings.

Figure 2A:
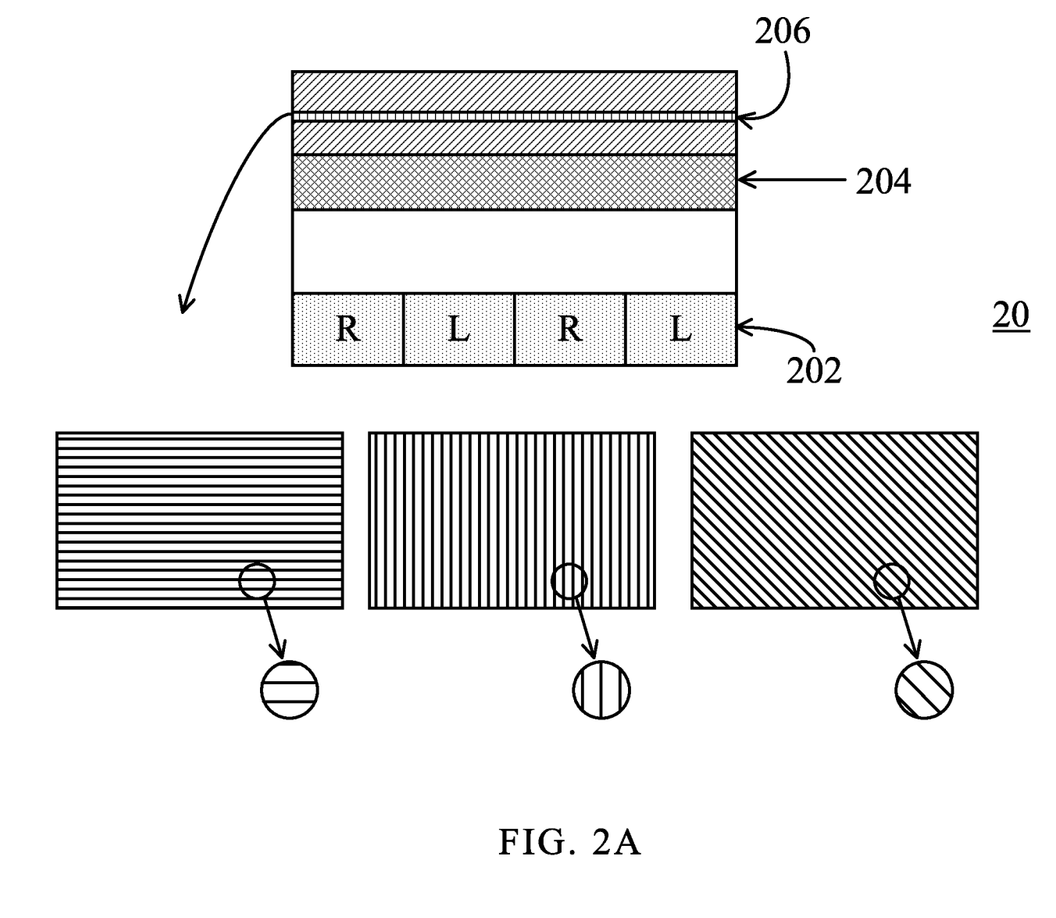
FIG. 2A is a view of a three dimension (3D) liquid display device (LCD) in the first embodiment of the present invention.

FIG. 2A is a view of a three-dimensional (3D) liquid crystal display device (LCD) in the first embodiment of the present invention. As shown in FIG. 2A, the 3D LCD device 20 includes an LCD layer 202, an LC electrode layer 204, and a transparent electrode layer 206. The LCD layer 202 is configured for generating 2D images. The LCD layer 202 is disposed at the bottom of the 3D LCD device 20 in this embodiment of the present invention. The LC electrode layer 204 is disposed on the LCD layer 202 and configured for performing a 3D display effect. The LC electrode layer 204 in the present embodiment can be a barrier, an LC lens or any other structure, such as an LC prism and so on, to perform a naked eye type 3D display, and it is not limited herein. A voltage is applied to the LC electrode layer 204 to perform the switch between 2D mode and 3D mode. The transparent electrode layer 206 is disposed on the LC electrode layer 204. In 3D mode, when the voltage or current is applied to the transparent electrode layer 206, a certain heat is generated in a charging time period because a certain resistance exists in the transparent electrode layer 206. The heat is generated to increase the temperature of the LC electrode layer 204, and the viscosity coefficient of the LC is reduced since the temperature thereof is increased. The viscosity coefficient is reduced to speed up the response time of the LC. Therefore, it improves the 3D display effect in the naked eye type. In this embodiment of the present invention, the material of the transparent electrode layer 206 is preferred to be Indium Tin Oxide (ITO), Aluminum Zinc Oxide (AZO), Indium Gallium Zinc Oxide (IGZO), Indium Zinc Oxide (IZO), Carbon Nanotube (CNT), Graphane, or Metal Mesh, and it is not limited herein. According to the structure of the above-mentioned 3D LCD device, in 3D mode, the voltage is applied to the LC layer 204 and the voltage or current is also applied to the transparent electrode layer 206 to generate a certain heat, and the viscosity coefficient of the LC is reduced to increase the response time of the LC so as to improve the 3D display effect in the naked eye type.

Figure 2B:
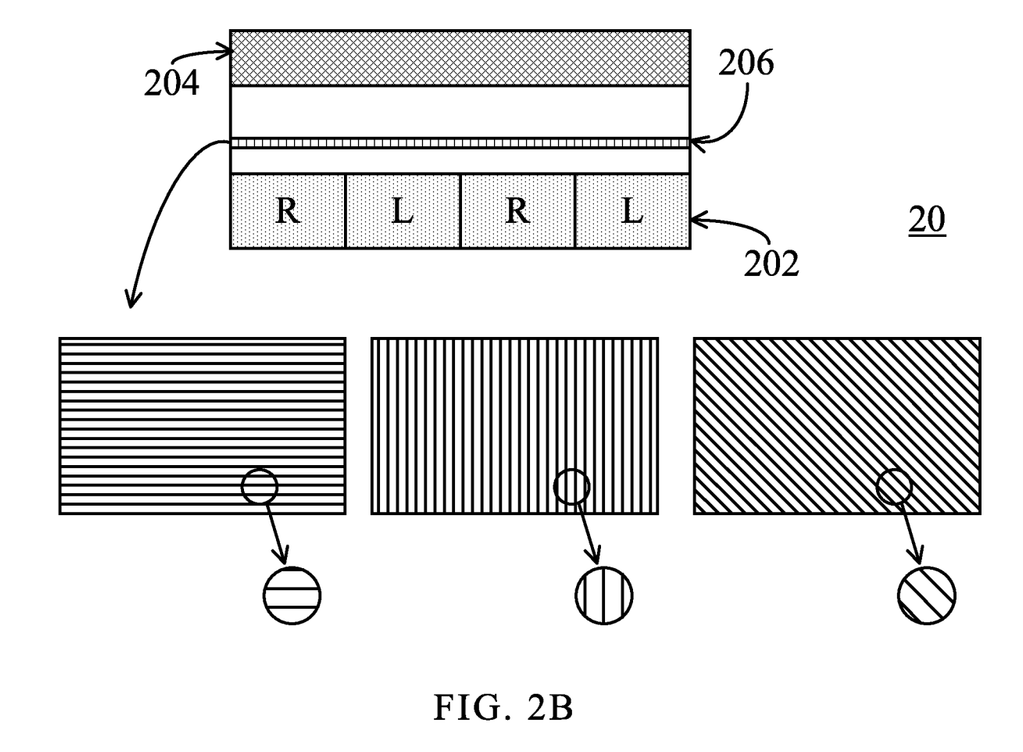
FIG. 2B is a view of a 3D LCD device in the second embodiment of the present invention.

FIG. 2B is a view of a 3D LCD device in the second embodiment of the present invention. As shown in FIG. 2B, the 3D LCD device 20 in the second embodiment also includes the LCD layer 202, the LC electrode layer 204, and the transparent electrode layer 206. In comparison with the first embodiment, the transparent electrode layer 206 of the 3D LCD device 20 in the second embodiment is disposed between the LCD layer 202 and the LC electrode layer 204. In the present embodiment, the voltage or current is applied to the transparent electrode layer 206 to generate a certain heat to increase the response time. Therefore, the 3D display effect of the naked eye type is improved. In addition, it should be noted that the pattern of the transparent electrode layer 206 in FIG. 2A or FIG. 2B can be horizontal strips, vertical strips or oblique strips, and it is not limited herein.

Figure 3A:
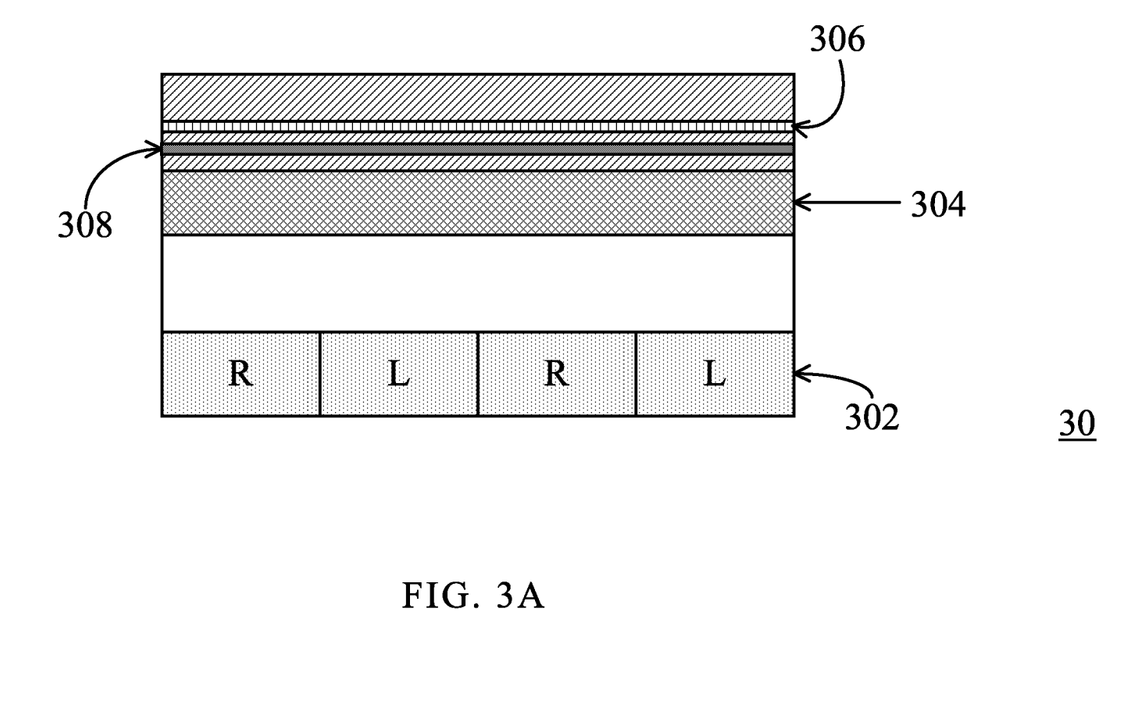
FIG. 3A is a view of a 3D LCD device in the third embodiment of the present invention.

FIG. 3A is a view of a 3D LCD device in the third embodiment of the present invention. As shown in FIG. 3A, the 3D LCD device 30 in the third embodiment includes an LCD layer 302, an LC electrode layer 304, a transparent electrode layer 306, and a transparent sheltering layer 308. The LCD layer 302 is disposed at the bottom of the 3D LCD device 30. The LC electrode layer 304 is disposed on the LCD layer 302, and is configured for performing a 3D display effect. The LC electrode layer 304 in the present embodiment can be a barrier, an LC lens, an LC prism or any other structure for performing a 3D display in the naked eye type, and it is not limited herein. The voltage is applied to the LC electrode layer 304 to perform the switch between 2D mode and 3D mode. The transparent electrode layer 306 is disposed on the LC electrode layer 304. In 3D mode, the voltage or current is applied to the transparent electrode layer 304 to generate a certain heat, and the heat is generated to reduce the viscosity coefficient of the LC and increase the response time of the LC. Therefore, the 3D display effect of the naked eye type is improved. However, since the voltage or current is applied to the transparent electrode layer 304, an extra electric field is generated because of the voltage or current. The extra electric field will affect the electrical field generated by the driving electrode of the LC electrode layer 304. Therefore, the LC guiding of the LC electrode layer 304 in 3D mode is affected. Accordingly, the 3D LCD device 30 in the present embodiment further includes a transparent sheltering layer 308. The transparent sheltering layer 308 in the third embodiment is disposed between the LC electrode layer 304 and the transparent electrode layer 306. The transparent electrode 308 is electrically connected with a common voltage of the 3D LCD device 30. Because of the installation of the transparent sheltering layer 308, the effect of the electrical field of the transparent electrode layer 306 on the electrical field of the LC electrode layer 304 is reduced. In this embodiment, the pattern of the transparent sheltering layer can also be horizontal strips, vertical strips, or oblique strips, and it is not limited herein.

Figure 3B:
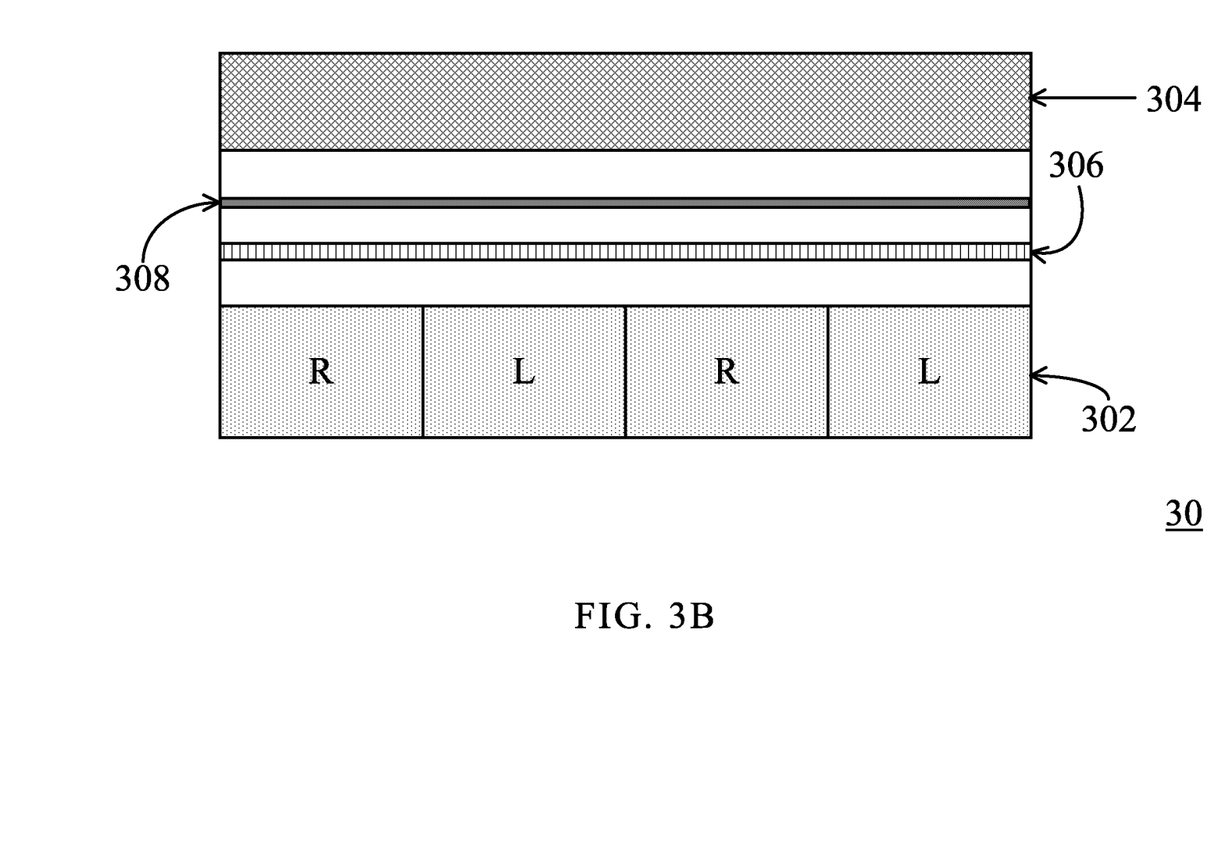
FIG. 3B is a view of the 3D LCD device in the fourth embodiment of the present invention.

Moreover, FIG. 3B is a view of the 3D LCD device in the fourth embodiment of the present invention. As shown in FIG. 3B, the transparent electrode layer 306 is disposed between the LCD layer 302 and the LC electrode layer 304, which is the same as the 3D LCD device shown in the second embodiment. Accordingly, the transparent sheltering layer 308 is disposed between the LCD layer 302 and the LC electrode layer 304, and the transparent sheltering layer 308 in the present embodiment can be used to reduce the effect of the electrical field of the transparent electrode layer 306 on the electrical field of the LC electrode layer 304.

The advantage in the present invention is that one transparent electrode layer is added above or below the LC electrode layer in the naked eye type 3D LCD device. When the voltage or current is applied to the transparent electrode layer, it is to heat up the transparent electrode in order to increase the temperature of the LC electrode layer. By increasing the temperature, the response time of the LC in the naked eye type 3D display can be improved to enhance the performance of the naked eye type 3D display.

As described above, the present invention has been described with preferred embodiments thereof and it is understood that many changes and modifications to the described embodiments can be carried out without departing from the scope and the spirit of the disclosure that is intended to be limited only by the appended claims.

What is claimed is:

1. A three-dimensional (3D) liquid crystal display (LCD) device, comprising:
   an LCD layer;
   a liquid crystal (LC) electrode layer disposed on the LCD layer and a voltage applied to the LC electrode layer to switch between 2D mode and 3D mode;
   a transparent electrode layer disposed on the LC electrode layer and a voltage or current applied to the transparent electrode layer to generate a certain heat in the 3D mode; and
   a transparent sheltering layer disposed between the LC electrode layer and the transparent electrode layer, and configured for reducing an effect of the electrical field of the transparent electrode layer on the electrical field of the LC electrode layer;
   wherein the certain heat generated by the transparent electrode layer increases the temperature of the LC electrode layer so as to increase the response time of the 3D LCD device and improve the naked eye type 3D display effect of the 3D LCD device.

2. The 3D LCD device according to claim 1, wherein the LC electrode layer is a barrier, an LC lens or an LC prism.

3. The 3D LCD device according to claim 1, wherein a material of the transparent electrode layer is selected from the group consisting of Indium Tin Oxide (ITO), Aluminum Zinc Oxide (AZO), Indium Gallium Zinc Oxide (IGZO), Indium Zinc Oxide (IZO), Carbon Nanotube (CNT), Graphane, and Metal Mesh.

4. The 3D LCD device according to claim 1, wherein the certain heat generated by the transparent electrode layer reduces a viscosity coefficient of the LC in the LC electrode layer to increase the response time of the 3D LCD device.

5. A 3D LCD device, comprising:
   an LCD layer;
   a liquid crystal (LC) electrode layer disposed on the LCD layer and a voltage applied to the LC electrode layer to switch between 2D mode and 3D mode;
   a transparent electrode layer disposed between the LCD layer and the LC electrode layer, and a voltage or current applied to the transparent electrode layer to generate a certain heat in the 3D mode; and
   a transparent sheltering layer disposed between the LC electrode layer and the transparent electrode layer, and configured for reducing an effect of the electrical field of the transparent electrode layer on the electrical field of the LC electrode layer;
   wherein the certain heat generated by the transparent electrode layer increases the temperature of the LC electrode layer so as to increase the response time of the 3D LCD device and improve the naked eye type 3D display effect of the 3D LCD device.

6. The 3D LCD device according to claim 5, wherein the LC electrode layer is a barrier, an LC lens or an LC prism.

7. The 3D LCD device according to claim 5, wherein a material of the transparent electrode layer is selected from the group consisting of Indium Tin Oxide (ITO), Aluminum Zinc Oxide (AZO), Indium Gallium Zinc Oxide (IGZO), Indium Zinc Oxide (IZO), Carbon Nanotube (CNT), Graphane, and Metal Mesh.

8. The 3D LCD device according to claim 5, wherein the certain heat generated by the transparent electrode layer reduces a viscosity coefficient of LC in the LC electrode layer to increase the response time of the 3D LCD device.

9. The 3D LCD device according to claim 1, wherein a pattern of the transparent electrode layer is one of horizontal strips, vertical strips, and oblique strips.

10. The 3D LCD device according to claim 5, wherein a pattern of the transparent electrode layer is one of horizontal strips, vertical strips, and oblique strips.

* * * * *